US008306803B2

(12) United States Patent
Clement

(10) Patent No.: US 8,306,803 B2
(45) Date of Patent: Nov. 6, 2012

(54) METHOD AND APPARATUS FOR ASSISTING INTEGRATED CIRCUIT DESIGNING WITH A SUBSTRATE COUPLING

(75) Inventor: Francois Clement, Virieu suir Bourbre (FR)

(73) Assignee: Coupling Wave Solutions CWS, Moirans (FR)

( * ) Notice: Subject to any disclaimer, the term of this patent is extended or adjusted under 35 U.S.C. 154(b) by 1019 days.

(21) Appl. No.: 11/989,464

(22) PCT Filed: Jul. 28, 2006

(86) PCT No.: PCT/FR2006/050763
§ 371 (c)(1),
(2), (4) Date: Oct. 21, 2008

(87) PCT Pub. No.: WO2007/012787
PCT Pub. Date: Feb. 1, 2007

(65) Prior Publication Data
US 2009/0234630 A1    Sep. 17, 2009

(30) Foreign Application Priority Data
Jul. 28, 2005    (FR) ..................... 05 52363

(51) Int. Cl.
*G06F 17/50*    (2006.01)
(52) U.S. Cl. .............. 703/14; 703/13; 716/115
(58) Field of Classification Search .......... 703/2, 13–14; 716/106–107, 115
See application file for complete search history.

(56) References Cited

U.S. PATENT DOCUMENTS

| 6,103,561 | A  | * | 8/2000  | Seshadri et al. ............. 438/210 |
| 6,920,417 | B2 | * | 7/2005  | Lescot et al. .................... 703/13 |
| 6,941,258 | B2 | * | 9/2005  | Van Heijningen et al. ..... 703/16 |
| 7,313,771 | B2 | * | 12/2007 | Reddy et al. ................... 716/136 |
| 2004/0163047 | A1 | * | 8/2004 | Nagahara et al. ............. 715/517 |

FOREIGN PATENT DOCUMENTS

EP    1 134 676    9/2001

OTHER PUBLICATIONS

Birrer., "Silencer! A Tool for Substrate Noise Coupling Analysis", 2003, 148 Pages.*
Meyer et al. , 1996 IEEE., "Modeling and Analysis of Substrate Coupling in Integrated Circuits"., p. 344-352.*
R. Singh, et al., "Efficient real-time modelling of substrate coupling in large mixed-signal Spice designed, using analogue HDL," IEE Proceedings: Circuits Devices and Systems, Institution of Electrical Engineers, Stenvenage, GB, vol. 145, No. 3, (Jun. 8, 1998), 180-184.

(Continued)

*Primary Examiner* — Eunhee Kim
(74) *Attorney, Agent, or Firm* — IM IP Law PLLC; C. Andrew Im

(57) ABSTRACT

The invention concerns a method for verifying, prior to fabrication, the proper operation of integrated circuit electronic systems using analog signals. It comprises the following steps: identifying (22) the noise-sensitive circuits, setting an acceptable sensitivity template for these noise-sensitive circuits, identifying (34) the noise-generating circuits, modeling the noise, determining (50) the function for transferring noise to the sensitive circuits, and comparing (58) the level of noise reaching the sensitive circuits to an acceptable sensitivity threshold template for the sensitive circuits.

12 Claims, 3 Drawing Sheets

OTHER PUBLICATIONS

Henry H.Y. Chan, et al., "Substrate Coupled Noise Reduction and Active Noise Suppression Circuits for Mixed-Signal System-on-a-Chip Designs," Proceedings of the 44th, IEEE 2001 Midwest Symposium on Circuits and Systems. MWSCAS 2001. Dayton, OH, Aug. 14-17, 2001. Midwest Symposium on Circuits and Systems, New York, NY: IEEE, US, vol. 1 of 2, (Aug. 14, 2001), pp. 154-157.

Ranjit Gharpurey, et al., "Substrate Coupling: Modeling, Simulation and Design Perspective," Quality Electronic Design, 2004, Proceedings, 5th International Symposium on San Jose, California Mar. 22-24, 2004, Piscataway, NJ USA, IEEE, pp. 283-290.

Seung Hoon Choi, et al., "Dynamic Noise Analysis with Capacitive and Inductive Coupling," Design Automation Conference, 2002, Proceedings of ASP-DAC 2002, 7th Asia and South Pacific and the 15th International Conference on VLSI Design, Proceedings, Bangalore, India Jan. 7-11, 2002, Los Alamitos, CA, USA, IEEE Comput. Soc, US, Jan. 7, 2002, pp. 65-70.

Li-Rong Zheng, et al., "Single Level Integrated Packaging Modules for High Performance Electronic Systems," IEEE Transactions on Advanced Packaging, IEEE Service Center, Piscataway, NJ, US, vol. 24, No. 4, Nov. 2001.

* cited by examiner

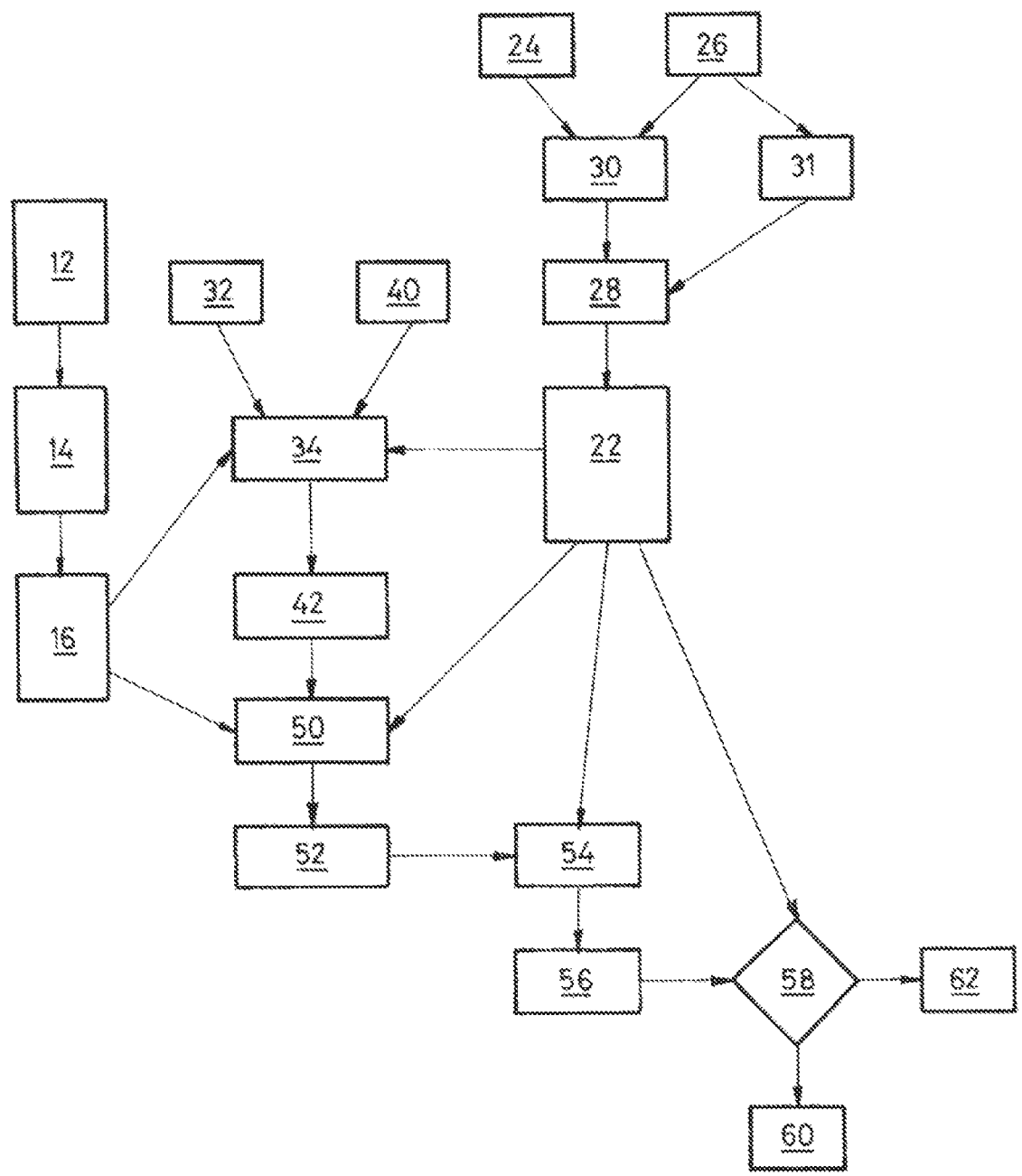
FIG_1

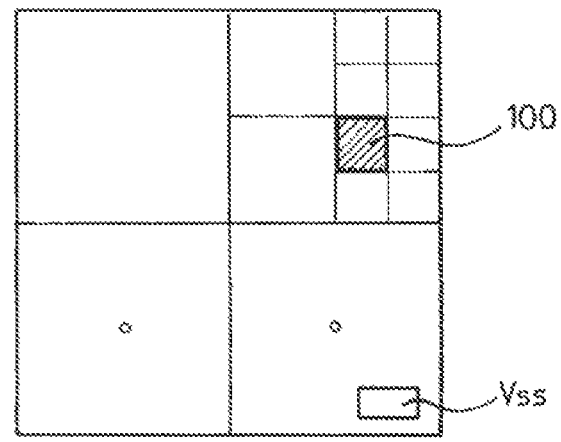
FIG_2
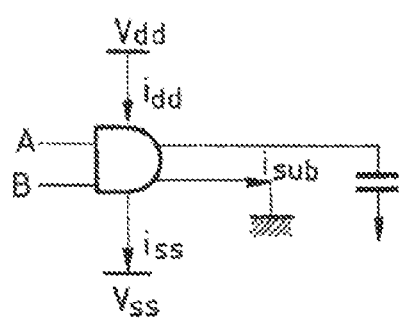
FIG_3
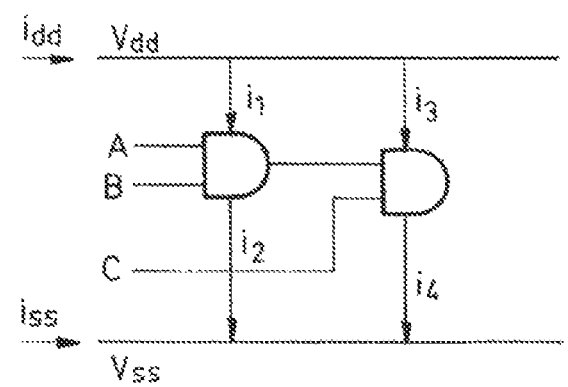
FIG_5
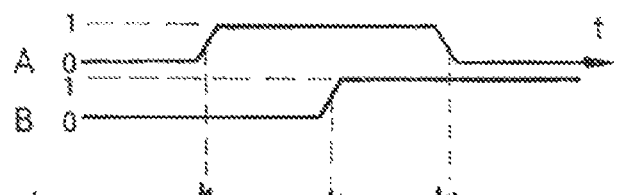
FIG_4a
FIG_4b
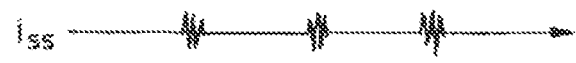
FIG_4c
FIG_4d FIG_6
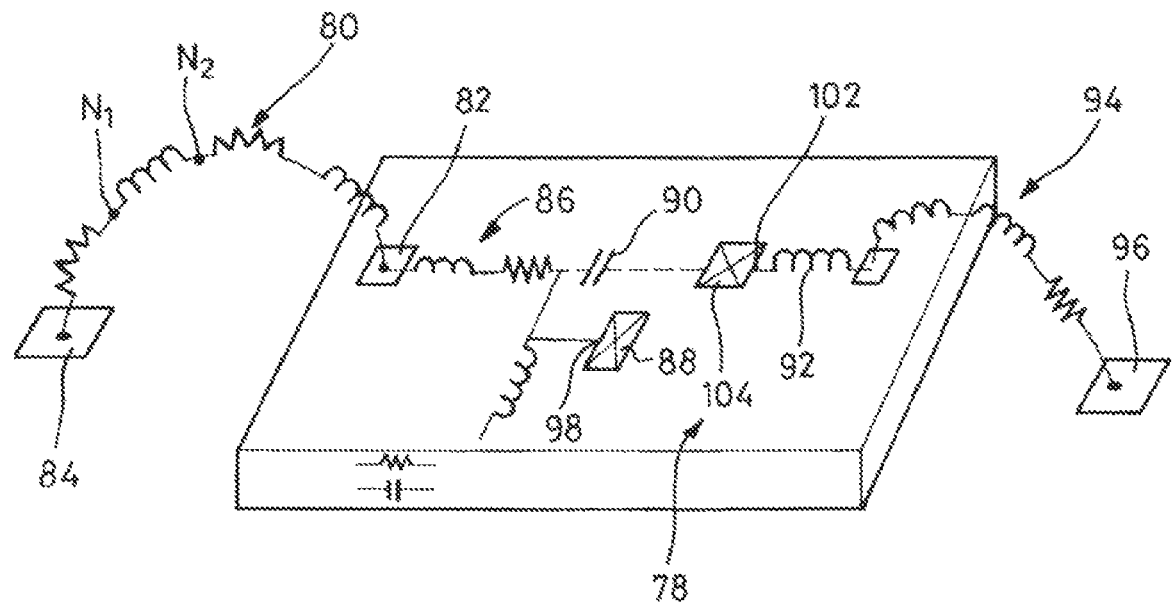
FIG_7
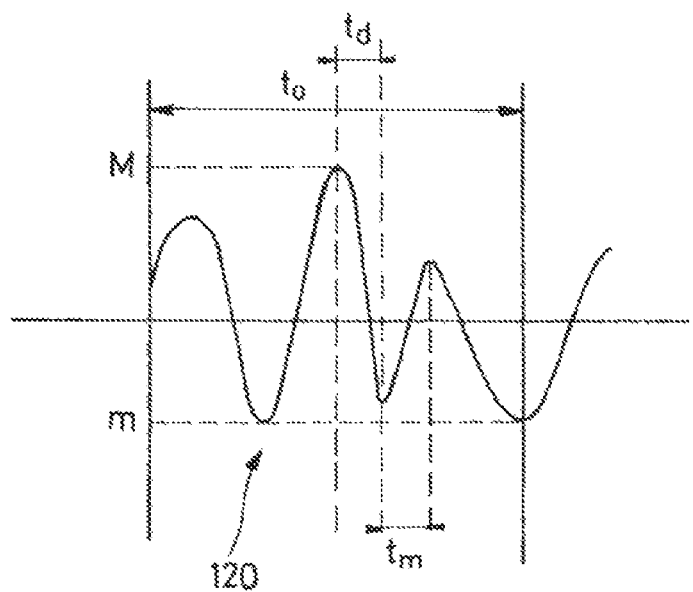

METHOD AND APPARATUS FOR ASSISTING INTEGRATED CIRCUIT DESIGNING WITH A SUBSTRATE COUPLING

RELATED APPLICATIONS

This application claims priority from PCT/FR2006/050763 filed Jul. 28, 2006 and French application No. FR 05 52363 filed Jul. 28, 2005, both incorporated by reference in their entireties.

TECHNICAL FIELD

The invention relates to a method, a device and a software product to aid in the design of integrated circuits, particularly on silicon.

BACKGROUND OF THE INVENTION

Integrated circuit fabrication is a very costly operation. Thus, before beginning mass production, it is essential to know all of the production parameters in advance and to assign at least some of the parameters values which make it possible to maximize the probability that the fabricated circuit will work properly.

To this end, there is an existing array of software products known as "electronic design automation tools," which aid in the design of integrated circuits from the description of the specifications of the circuit to be produced to the production of the photographic masks used in the fabrication of the circuit.

However, the development of the technology for integrating circuits on silicon is such that these design automation tools do not make it possible to obtain satisfactory results.

It will be recalled, first of all, that electronic systems are either formed of an integrated circuit on a single silicon substrate, or composed of an integrated electronic system formed of several integrated circuits in a single package or in different packages. Hereinafter, we will use the term integrated electronic system to designate either an integrated circuit on a single substrate, or an assembly of such integrated circuits, whether in a single package or in different packages.

Integrated electronic systems are commonly formed of hundreds of millions of elementary components. Under these conditions, design automation tools use abstract models which make it possible to simulate, in a simplified way, the behavior of the components, particularly the electrical and/or magnetic and/or thermal behavior. In other words, these tools idealize the operation of the components. For example, when simulating an integrated circuit on a single substrate, the silicon substrate is considered to be ideal, i.e., either perfectly insulating or perfectly conductive. To give another example, these known tools consider the power distribution grid of the components to be perfect, i.e., non-resistive to the passage of the electric current.

These abstract models are intended to verify whether, after the assembly of all the elementary components, the electronic system meets the initial specifications. However, the results provided by the simulation are different from the real behavior after fabrication of the electronic system. These differences are, of course, due to the simplifying hypotheses introduced during the simulation. For example, if the resistance of the power distribution network is disregarded, the effect of the potential drops that exist in the real circuit will not be simulated; these potential drops can cause significant variations in behavior, making the integrated circuit unusable after fabrication.

Electronic design automation tools have evolved with the development of electronic systems. In particular, the progressive reduction of the distance between components and the reduction of the supply voltage, along with the increase in the operating speed of the systems, have made it necessary take into account both the interference between components and very fast signal commutation speeds. Thus, the current tools make it possible to simulate both the digital circuits that commute the signals processed between the extreme values of the supply voltage and the interference that induces parasitic phenomena in the form of advance or delayed transmission of the signals from one component to another.

But in the case of analog circuits—i.e. circuits that process signals which can assume any possible potential value between the extreme values set by the supply voltage—the interference gives rise to parasitic phenomena which are more complex than signal delays or advances. For example, the presence of interference can induce a modification in the electrical potential or the frequency of the analog signals as well as a variation in the signal processing speed.

It is noted that in a digital circuit, in order to change from a low-value signal to a high-value signal or vice versa, the signal must physically assume the intermediate values, but the latter do not carry any information. In an analog circuit, on the other hand, the intermediate values (of which there may be a large, practically infinite, number) do carry information.

However, at the present time, no satisfactory solutions for simulating the effects of interference on analog parts exist.

This lack of a software tool for verifying the integrity of analog systems results in disparities between the desired operation and the actual operation of the fabricated circuits, which can even result in circuits that do not work. Thus, we note that a majority of electronic systems do not work properly after a first fabrication.

SUMMARY AND OBJECTION OF THE INVENTION

The invention provides a method, a device and software tools for determining prior to fabrication whether an integrated circuit electronic system works properly.

The method for verifying the proper operation of integrated circuit electronic systems using analog signals consists in:
  identifying the noise-sensitive circuits and setting an acceptable sensitivity template for these noise-sensitive circuits
  modeling this noise and determining the function for transferring the noise to the sensitive circuits, and
  comparing the level of noise reaching the sensitive circuits to the acceptable sensitivity threshold templates for the sensitive circuits.

Under these conditions, the circuit will be considered to work if all of the noise-sensitive circuits receive noise signals below their noise sensitivity thresholds.

It should be noted that identifying the noise-sensitive circuits constitutes a big simplification, since it makes it possible to limit calculations.

The term "template" refers to the noise sensitivity threshold values as a function of frequency and/or time. Setting such a template for the various sensitive circuits, which involves the definition of thresholds, makes it possible to automate the method according to the invention.

In one embodiment, the noise-sensitive circuits are considered to be either analog circuits or digital circuits.

Thus, the noise-sensitive circuits can be chosen from the group comprising analog and RF circuits such as amplifiers, filters, oscillators, mixers, sampler-blockers, digital memory circuits, phone-locked loops (PLLs), input-output circuits and voltage references. It is understood that a circuit comprising at least one noise-sensitive circuit is itself considered to be a noise-sensitive circuit.

In one embodiment, the method is such that the noise-sensitive circuits can be selected at will. In other words, in this embodiment, the method makes it possible to select the noise-sensitive circuits automatically and to choose at will any noise-sensitive circuits that have not been selected automatically.

All of the circuits in the system can, in one embodiment, be considered to generate noise. The noise is then modeled for all of the circuits in the electronic system. In fact, we observed that a circuit which appears to generate very low noise may be the circuit which disturbs the operation of the electronic system the most. This disturbance may be due to the fact that it generates noise constantly, or that it generates this noise in a frequency range which corresponds to the frequency range in which an analog circuit is sensitive. Under these conditions, it may be preferable not to disregard any circuit in the system.

In a variant, only certain circuits in the system are considered to be noise-generating. Depending on the degree of precision in the modeling and the calculation time desired, it is thus possible to take into account a lower or higher number of noise-generating circuits.

In one embodiment, these noise-generating circuits are chosen from the group comprising digital circuits, memory cells and analog and RF circuits such as VCOs and power amplifiers, and input-output circuits. It is understood that a circuit comprising at least one noise-generating circuit is itself considered to be a noise-generating circuit.

In order to identify the noise-generating circuits and sensitive circuits, as well as their noise-generating and sensitivity parameters, according to one embodiment, the method is based on data related to the topology of each circuit (which is generally available in circuit libraries) and consists in determining the position of the various circuits or blocks, determining the size and the position of the various power supply lines, determining the input-output points, and determining the noise reaching each sensitive circuit from the position of the noise-generating circuits relative to these sensitive circuits.

It will be recalled that the term circuit, in an integrated circuit electronic system, refers to elements which can be found at various hierarchical levels. The first level of the hierarchy is a component such as a transistor, the second level of the hierarchy is an elementary function such as and AND gate or an OR gate, the third level of the hierarchy is a set of elementary functions for performing a given function, etc.; the number of hierarchical levels is not limited.

In a preferred embodiment of the invention, based on the observation that the noise is transported mainly by the power supply lines, these power supply lines are identified and isolated so that these lines may be primarily or exclusively taken into account in determining the noise transfer.

Thus, compared to the circuit modeling methods of the prior art, a very big simplification is obtained, since the known methods consist in taking into account not only the power supply but also all of the other signals transported, including the information and clock signals. Moreover, there are connections which do not transport any signals. The simplification according to the invention does not compromise the quality of the modeling.

Furthermore, since each power supply is connected to a limited number of circuits, there is a simplification due to the fact that the characterization of the noise and of the sensitivity of the circuits to this noise can be done individually for each power supply network.

Another simplification consists of assigning greater weight to the noise-generating circuits near the sensitive circuits than to the noise-generating circuits further away from the sensitive circuits. For example, the subdivision is finer the nearer the noise-generating circuit is to a sensitive circuit.

In one embodiment, none of the connections in a circuit model is disregarded, and each of them is given a weighting that can be adjusted at will. For example, not only are the power supply connections taken into account, but so are the connections with the clock signals, which supply steep ascending edges at a high frequency, and the main buses. The weight assigned to each connection in a model is, for example, a degree of precision for each connection.

By way of illustration, a first degree of precision for a connection is to consider it to be simply a resistive element, a second degree of precision is to consider it to be simultaneously resistive and capacitive, and a third degree of precision consists of considering this connection to be simultaneously resistive, capacitive and inductive.

According to the invention, the noise modeling includes modeling the generation of noise by the various noise-generating circuits, modeling the injection of this noise into the substrate, the interconnections and/or the circuit package of the electronic system, and modeling the propagation of this noise inside the substrate, the interconnections and/or the circuit package of the electronic system.

BRIEF DESCRIPTION OF THE DRAWINGS

Other features and advantages of the invention will emerge from the description of certain embodiments, which is given in reference to the attached drawings, in which:

FIG. 1 is a diagram showing several steps of a method according to the invention;

FIG. 2 is a diagram illustrating one step of a method according to the invention;

FIG. 3 is an AND gate diagram indicating signals capable of generating noise;

FIGS. 4a, 4b, 4c and 4d are diagrams showing a step for storing wave forms for characterizing the noise;

FIG. 5 is a diagram showing two AND gates;

FIG. 6 a simplified diagram of an integrated circuit model; and

FIG. 7 is a diagram of a step of a method according to the invention.

DETAILED DESCRIPTION OF THE INVENTION

FIG. 1 represents the data and software products required to implement an exemplary embodiment of the invention.

To define an integrated circuit electronic system, we begin with known circuits and their encapsulations. This data, which will hereinafter be called technological data, specifically relates to the silicon substrates (in particular, the type and concentration of the carriers), the nature and thicknesses of the various metallization layers, the types of insulators and the packages.

Thus, a database 12 containing the characteristic data furnished by the manufacturers—i.e., the silicon foundries or package manufacturers—is provided. For example, in an intrinsically known way, the silicon manufacturer furnishes detailed information on the variation in the density of the impurities in the thickness of a substrate, and on the thicknesses of the conductive layers and oxides disposed on the substrate.

The characteristics required for the integrated circuit design aid system are extracted from the base 12 by a characterization block 14 and these data extracted by the block 14 are compressed in a block 16.

The term compression refers to a method for reducing the quantity of information to be stored. For example, the silicon foundry furnishes high-precision information on the variation in the density of the impurities in the thickness of the substrate, and the compression consists in simplifying this data by considering only discrete slices of the substrate and selecting only one value from each slice.

Characterizing an integrated circuit electronic system requires knowing, in addition to the technological data, the circuit data that are stored in a block 22 of cell models as well as the data related to the geometric layout of the circuit elements relative to one another, these data being stored in the blocks 32 and 40.

The cell models stored in the block 22 are composed of electric circuits formed of resistors, capacitors, inductors and transistors and of the electrical description of the noise sources and the noise sensitivity templates. The data on the elementary circuits are stored in a block 24. The term noise sensitivity "template" refers to the acceptable noise sensitivity thresholds as a function of frequency and/or time.

According to the invention, in order to determine whether the circuits used to produce an integrated circuit system work properly, the noise characteristics of its various components—i.e., the noise emitted by each circuit and the noise sensitivity of each circuit—are determined.

To characterize the noise, it is necessary to perform experiments, the description of which is stored in a block 26. These experiments are either measurements (block 31) and/or simulations (block 30). After the measurements and/or simulations are performed, experimental (simulation or measurement) signals are obtained, which are defined and stored in a block 28.

These cell characteristic data are thus provided to the block 22, which not only contains the layout of the circuits (i.e. the various circuit parts and their connections), but also the noise produced by each circuit and the noise sensitivity of each of these circuits.

Later, we'll define, in relation to the figures, methods for characterizing the noise emitted and/or the sensitivity of each circuit to the noise received. The sensitivity to the noise received is characterized by a sensitivity template.

In order for the circuit to work properly, each of the sensitive circuits must be subjected to a noise below a given threshold. This noise depends not only on the components of the circuit and their connections, but also on their geometric positions relative to one another. This segmentation of the circuits is performed in the block 34, which receives data provided by a block 32 in which the respective positions of the various circuits and the positions of the connection lines are stored. If the electronic system is formed of several integrated circuits, for example in a single package, a block 40 is provided in which the data on the geometric layout inside the package, particularly the position of the circuits relative to one another inside the package, are provided. The block 40 also contains the data on the relative positions of the integrated circuits when an array of integrated circuits in different packages is used.

To limit the calculations, as described above, the circuit data kept in the block 34 is stored by a block 42; the segmentation thus produced makes it possible to select, based on circuit models stored in the block 22, the physical elements of the noise-generating circuits and the noise-sensitive circuits.

Thus, based on the data stored by the block 42 and the technological data provided by the block 16, and with the aid of the circuit and noise data provided by the block 22, a block 50 fully characterizes the parasitic interference between the circuits. These characterizations or models contain, in particular, the transfer function that conveys interference throughout the system. These characterizations are stored in a block 52.

A block 54 receives data from the block 22 and from the block 52 in order to calculate the distribution of the noise coming from the elements generating such interference. This noise distribution is stored in a block 56. This noise distribution is used in a block 58 which scans all of the sensitive circuits and compares the sensibility template of each of these sensitive circuits with the noise to which each of these circuits is subjected, taking into account the position of each of them. If none of the noise-sensitive elements is receiving interference over its threshold, then a signal 60 indicating the proper operation of the integrated electronic system is produced. In the opposite case, a signal 62 indicating the defectiveness of this integrated electronic system is produced.

Link Between the Technological Data Block 16 and the Block 50 that Provides the Electrical Models:

To generate the electrical models while taking the technological data into account, it is possible to use various known tools, organized in the form of electrical model libraries of circuits formed of components such as CMOS components. For example, the American company Cadence Design Systems provides a piece of software called SubstrateStorm. Another example is the software tool Space from the Dutch University of Delft.

The models represent both the components and the production parameters, including the substrate, the package and the interconnections. The latter are formed of superposed layers of metal and insulator. The model for an interconnection is a resistor and an inductor and the insulator between two metal layers forms a capacitor. Moreover, a mutual inductor is considered to exist between two metal layers separated by an insulator.

For example, the software tool Assura from the company Cadence Design Systems characterizes the interconnections as inductors, resistors and capacitors. The same is true of also the tools "Calibre xRC" and "Calibre xL" from the company Mentor Graphics.

The software tool Space mentioned above also makes it possible to characterize the interconnections. However, this tool is limited to resistors and capacitors. It can be supplemented by a tool for extracting inductors and mutual inductors, such as the software tool Fast Henry from the American university MIT. This tool is described in the article by M. Kamon entitled "Fast Henry: A Multipole-Accelerated 3-D Inductance Extraction Program," IEEE Transactions, MIT, Volume 42, No. 9, pages 1750 through 1758, 1994.

The electrical models of packages are generally furnished by the manufacturers of such packages. It is also possible to use a software product called HFSS from the American company Ansoft.

Link Between the Technological Data Block 16 and the Segmentation Block 34

The existing software products make it possible to model pieces of lines regardless of their position in the circuit. The lines perform power supply transport, clock signal transport and information transport. There are also line elements that do not transport any signals.

A particularly advantageous embodiment of the invention is based on the observation that the noise is mainly transported by the power supply lines. Thus, according to this embodiment, in the block 34, these power supply lines are identified and isolated, and only these lines, along with the substrate and the package, are used to form the electrical model 50 which will characterize the noise-generating elements or parasitic elements.

Thus, contrary to the prior art, instead of taking into account all of the electrical nodes—i.e. generally millions of electrical connections—only a very limited number of connections are considered, without compromising the quality of the modeling.

However, the power supply nodes are still very high in number. In fact, a 1-mm long line comprising connections of 0.1μ comprises 10,000 line segments. Moreover, the substrate comprises several layers, which further increases the complexity.

To further limit the calculations, using the data provided by the cell model block 22 and the block 32 which provides the geometry of the integrated circuits, the elements that are really noise-sensitive are identified. Moreover, the distance separating the noise-generating elements from the noise-sensitive elements is taken into account.

In this identification, it is noted, first of all, that the noise-generating elements are identified for each power supply. Moreover, according to one embodiment, in order to take into account the distance between each noise generator and each noise-sensitive element, the two-dimensional space is subdivided, for example into a network of square meshes, the pitch of which increases as a function of the distance from the noise-sensitive elements, and in each mesh, a simplification is performed so as to retain only one equivalent contribution from all of the noise-generating circuits located in that mesh. In this simplification:

a) All of the electrical elements located between two identical nodes are considered to be in parallel.

b) In a mesh, each power supply network is connected to the substrate by a single physical object. This virtual physical object has a given shape, for example square, whose area is the sum of the areas of the real physical objects found in each circuit of the mesh. Its position corresponds to the barycenter of all the surfaces considered.

Thus, more details on the noise are obtained for the noise-generators when they are near noise-sensitive elements.

For example, various successfully applied meshing methods are described in an article by Volker Gaede and Olivier Günther entitled "Multidimensional Access Methods, ACM Computer Survey, Vol. 30, No. 2, pages 170 through 231, June 1998.

In FIG. 2, we see that the space near a noise-sensitive element 100 is subdivided into fine meshes, whereas for the meshes far from the element 100, the pitch is substantially larger.

In a variant, the software product is such that it makes it possible to take all of the nodes into account, but by assigning a different weight to each node. For example, if one wishes to take into account only the power supply nodes, a zero weighting will be assigned to the interconnections with the clock signals and to the busses. It is also possible to indicate a degree of precision in the electrical model for each node; for example, the model can disregard the inductors of each node. In another example, the interconnections with the clock signals—which provide steep ascending or descending edges at a high frequency—and with the main busses are selected.

The Cell Models 22

These cell models 22 specifically serve to identify and/or characterize the noise-generating elements.

To characterize these noise-generating elements, it is possible, according to a first embodiment of the invention, to use the technology described in European patent application 1,134,676. To illustrate the method described in this prior patent, FIG. 3 represents an AND gate comprising two inputs A and B with a power supply that supplies a voltage $V_{dd}$ and an intensity $i_{dd}$ at the input, and a voltage $V_{ss}$ and a current $i_{ss}$ at the output. In addition, this AND gate supplies its output signal to a charge element which is, for example, a capacitor. Lastly, the AND gate injects a current $i_{sub}$ directly into the semiconductor substrate.

To characterize the noise provided by such an AND gate, various possible commutations are simulated. Thus, as shown in FIG. 4a, the signals in the inputs A and B, are simulated with ascending edges and descending edges at various instants.

For each of these situations, the values $i_{dd}$, $i_{ss}$ and $i_{sub}$ are determined, for example by simulation, as represented by the diagrams of FIGS. 4b, 4c and 4d.

The current $i_{ss}$ is the consumed current, which differs from the supplied current $i_{dd}$ since this supplied current $i_{dd}$ is diverted to the charge element and to the substrate $i_{sib}$.

The various wave forms corresponding to the various transitions are stored in a high-capacity database.

Next, beginning with an elementary AND gate circuit, we consider the more complex circuit composed of two AND gates, as represented in FIG. 5. In this example, an input of the second AND gate is connected to the output of the first AND gate and the second input of the second AND gate receives a signal C. Thus, this two AND gate circuit comprises three inputs A, B and C.

The various possible combinations of signals A, B and C are then considered. A combination of values of signals A, B and C constitutes an input vector. Given that, in general, it is not possible to consider all of the possible combinations, the known methods make it possible to select representative input values.

In deducing the wave forms of the currents from the wave forms obtained in the case of a single AND gate, it is observed that the input current of the power supply is the sum of the input currents $i_1$ and $i_3$ in each of the gates, and likewise, the output current $i_{ss}$ is the sum of the output currents $i_2$ and $i_4$ in each of the gates. Under these conditions, the wave forms of the currents $i_{dd}$ and $i_{ss}$ are sums of stored values (FIGS. 4b ands 4c).

The cell models 22 are also used to identify and characterize the sensitivity template for the noise-sensitive cells.

It will be recalled that "template" refers to the noise sensitivity threshold of the corresponding cell for each frequency. In other embodiments, the noise sensitivity values are considered as a function of time, this time being determined by a reference such as a clock. For example, in the case of an analog-digital converter, the noise sensitivity is highest during the sampling of the analog signal.

It should also be noted that a cell is not considered to be exclusively noise-generating or noise-sensitive. Thus, each circuit model is a noise generator, a noise sensitivity "template," or a combination of the two.

It may also be said that it is necessary to identify the physical connection of each cell to the substrate for each of the power supply networks. Moreover, it may be said that the precision of the calculations can be improved by taking into account the resistance of the lead that connects the active components of the cell to the power supply connection point of the power supply network in the cell. Lastly, it is also generally necessary to take into account the decoupling capacitors between power supplies, formed by complementary transistor structures, these capacitors having a significant influence on the transfer of the noise.

Distribution of the Noise to the "Victims"

To characterize the noise, it is necessary to determine the variations in the voltages $V_{dd}$ and $v_{ss}$ for each power supply network. To this end, we begin with the variations determined for $i_{dd}$ and $i_{ss}$, as described above (in a simplified example), and we take into account the circuit models which are, for example, simulated by RC (resistor-capacitor) networks.

In an intrinsically known way, the power supply networks of the noise-generating circuits are considered to be connected to the noise-sensitive circuits via the substrate, which is also simulated in the form of an RC circuit. Thus, the noise is characterized by the wave forms at the connection points connected to the noise-sensitive circuits.

The method for characterizing noise distribution just described is not always satisfactory. In fact, it requires a relatively complex analog simulation. This analog simulation is a "Spice" type simulation, for example as proposed in a version "3f5" on the website of the American university, Berkeley. There are also commercial simulators such as the "Spectre" software distributed by the company Cadence Design Systems.

This method also has the drawback of requiring a simplified model that takes into account only the coupling through the substrate between noise-generating circuits and noise-sensitive circuits.

Thus, according to one embodiment, the invention provides two improvements to the known art, which improvements can be used independently from one another.

The first improvement consists of using a more realistic circuit model, as represented by a simplified example in FIG. 6. The circuit model takes into account not only the coupling through the substrate, but also the coupling through the interconnections and through the package. Thus, as shown in FIG. 6, the substrate 78 supports a power supply input pad 82 connected by a wire 80 to a pin 84 of the package. The link wire 80 is modeled by an inductor and a resistor.

Interconnections in the form of metal lines 86 are formed in the substrate 78, for example for the power supply network $V_{dd}$. These metal lines 86 supply power to a circuit 88 produced on the substrate 78, this circuit 88 being for example digital, with one access 98. The wires 86 are represented by inductors and resistors as well as capacitors 90 with other wires 92. In this model, the mutual inductors between wires 80, 86, and 94 are taken into account. The wire 94 itself is also connected to a pin 96 of the package. The precision of the model can be improved by including the capacitors between the wires 86 and the substrate 78, as well as the coupling capacitors between wires 80 and 94 and between pins 84 and 96.

The pins 84, 96, along with the access 98 to the circuit 88 and the access 102 to a circuit 104 on the substrate, constitute interconnection points to the power supplies and the noise-sensitive circuits. The circuits 88 and 104 are connected to the substrate.

It is known to characterize circuits comprising multiplicities of nodes, i.e., the nodes related to the power supplies 82, 84, 98, 102, 96 as well as the nodes $N_1$, $N_2$, which constitute the nodes of a network. Kirchoff's laws make it possible to connect the various current intensity values in the network to one another.

It is known that the voltages and the currents injected into such a system from the outside may be represented by a vector b and that this vector b is connected to the vector x, which represents the internal variables of the system, i.e. the node voltages and the branch currents. The relation between b and x is the following:

$$b=Ax$$

in which relation A is a matrix representing the characteristic parameters of the various elements of the network. This matrix is a transfer function combining the respective influences of the substrate, the interconnections and the package. Thus, x represents the influence of the noise generators on the noise-sensitive elements.

According to yet another aspect of the invention, which may be used independently from the aspect just described—i.e., using a circuit model that is more complete than the model of the prior art—the calculations are simplified by assigning only a limited number of parameters to the wave forms of the currents and voltages at the access points.

To this end, according to one embodiment, each wave form 120 (FIG. 7), which is represented by a current or voltage signal that varies as a function of time, is divided into time windows of a given duration, for example 100 picoseconds, and in each of these time windows, for example $t_0$ (FIG. 7), the minimum value m and the maximum value M of the signal, as well as the minimum ascent time $t_m$ and the minimum descent time $t_d$ of the signals, are determined. These four parameters, m, M, $t_m$, $t_d$ are characteristics of a triangular signal. This signal can easily be represented by its Fourier transform or a similar operation such as a Laplace transform. The number of parameters of these transforms is also limited. Thus, the equation Ax=b can be used with the Fourier or Laplace transform, making it possible to avoid complex analog simulations. In other words, with this simplification, the prior values of the signals are not taken into account, the instantaneous values of these signals being sufficient to characterize the noise reaching each sensitive circuit.

In a variant, in place of the parameters $t_m$ and $t_d$, the steepest ascending and descending edges of the signals are considered.

The method according to the invention makes it possible to determine whether an integrated electronic system using analog signals works properly even before producing it physically, with databases having reasonable storage capacities and with relatively short calculation times.

The invention also extends to the electronic circuit or the software capable of implementing the method described above.

The invention claimed is:

1. A computer based method for verifying, prior to fabrication, a proper operation of an integrated circuit electronic system using analog signals, comprising the steps of:
   identifying noise-sensitive circuits of said integrated circuit electronic system;
   setting an acceptable sensitivity threshold template for said noise-sensitive circuits using a circuit model;
   modeling noise using a circuit model;
   determining a function for transferring the noise to said sensitive circuits using a circuit model;
   comparing a level of noise reaching said noise-sensitive circuits to said acceptable sensitivity threshold template for said sensitive circuits;
   identifying noise generating circuits;
   assigning variable weights to said noise generating circuits based on their proximity to said noise-sensitive circuits;
   subdividing a two-dimensional space of said integrated circuit electronic system into subdivisions, wherein a pitch of a subdivision increases as a function of a distance from said noise-sensitive circuits;

performing a simplification for each subdivision to retain only one equivalent contribution from all of said noise-generating circuits located in that subdivision by considering all electrical elements located between two identical nodes to be parallel, each power supply network in that subdivision to be connected to a substrate by a single virtual physical object having a given shape whose area is a sum of areas of real physical objects found in each circuit of that subdivision, and a position of the virtual physical object to correspond to a barycenter of all surfaces considered; and wherein said circuit model takes into account a coupling through a substrate, and a coupling through interconnections and through a package, the package modeled by inductor and resistor elements and the interconnections modeled by inductor, resistor and capacitor elements.

2. The computer based method of claim 1, wherein the step of identifying identifies said noise-sensitive circuits from a following group: analog and RF circuits, amplifiers, filters, oscillators, mixers, sampler-blockers, digital memory circuits, phase locked loops (PLLs), input-output circuits, and voltage references.

3. The computer based method of claim 1, wherein the steps of modeling and determining comprise a step of considering only interconnections that are connected to power supply lines.

4. The computer based method of claim 1, wherein the steps of modeling and determining comprise a step of assigning each connection or node a variable weight to isolate and consider power supply connections and connections that supply signals with steep ascending or descending edges.

5. The computer based method of claim 1, wherein the step of identifying identifies said noise-generating circuits from a following group: digital circuits, memory cells, analog and RF circuits, voltage controlled oscillators (VCOs) and power amplifiers.

6. The computer based method of claim 1, wherein the steps of identifying said noise-generating circuits and said noise-sensitive circuits further comprise steps of identifying their respective noise-generating and noise-sensitivity parameters; and determining relative positions of various blocks or circuits composing said integrated circuit electronic system, size and position of various power supply lines, input-output points, and noise reaching each noise sensitive circuit from the relative positions of said noise-generating circuits and said noise-sensitive circuits.

7. The computer based method of claim 1, further comprising a step of modeling the noise of said noise-generating circuits by storing a plurality of signal waveforms at nodes or connection through which the noise passes for selected input signals.

8. The computer based method of claim 7, further comprising a step of dividing each waveform into time windows and representing said each waveform in each time window by a triangular signal.

9. The computer based method of claim 8, further comprising a step of obtaining said triangular signal from a minimum value and a maximum value in each time window, or from a minimum ascent time and the minimum descent time in each time window, or from a steepest ascending slope and a steepest descending slope in each time window.

10. The computer based method of claim 8, further comprising a step of performing a Fourier transform or Laplace transform on the triangular signal to determine the noise level.

11. The computer based method of claim 7, further comprising a step dividing each waveform into time windows and selecting values representing said each waveform in each time window so that only instantaneous values of said each waveform are taken into account without taking prior values into account.

12. A method implemented in an electronic circuit for verifying, prior to fabrication, a proper operation of an integrated circuit electronic system using analog signals, comprising the steps of:

identifying noise-sensitive circuits of said integrated circuit electronic system;

setting an acceptable sensitivity threshold template for said noise-sensitive circuits using a circuit model;

modeling noise using a circuit model;

determining a function for transferring the noise to said sensitive circuits using a circuit model;

comparing a level of noise reaching said noise-sensitive circuits to said acceptable sensitivity threshold template for said sensitive circuits;

identifying noise generating circuits;

assigning variable weights to said noise generating circuits based on their proximity to said noise-sensitive circuits;

subdividing a two-dimensional space of said integrated circuit electronic system into subdivisions, wherein a pitch of a subdivision increases as a function of a distance from said noise-sensitive circuits;

performing a simplification for each subdivision to retain only one equivalent contribution from all of said noise-generating circuits located in that subdivision by considering all electrical elements located between two identical nodes to be parallel, each power supply network in that subdivision to be connected to a substrate by a single virtual physical object having a given shape whose area is a sum of areas of real physical objects found in each circuit of that subdivision, and a position of the virtual physical object to correspond to a barycenter of all surfaces considered; and wherein said circuit model takes into account a coupling through a substrate, and a coupling through interconnections and through a package, the package modeled by inductor and resistor elements and the interconnections modeled by inductor, resistor and capacitor elements.

\* \* \* \* \*